United States Patent
Vozila et al.

(10) Patent No.: US 10,102,849 B2
(45) Date of Patent: *Oct. 16, 2018

(54) SYSTEMS AND METHODS FOR PROVIDING METADATA-DEPENDENT LANGUAGE MODELS

(71) Applicant: Nuance Communications, Inc., Burlington, MA (US)

(72) Inventors: Paul J. Vozila, Arlington, MA (US); Wilson Tam, Palo Alto, CA (US); Nils Lenke, Rheinbach (DE)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/469,312

(22) Filed: Mar. 24, 2017

(65) Prior Publication Data

US 2017/0200447 A1 Jul. 13, 2017

Related U.S. Application Data

(63) Continuation of application No. 13/870,356, filed on Apr. 25, 2013, now Pat. No. 9,626,960.

(51) Int. Cl.
*G10L 15/26* (2006.01)
*G06F 17/30* (2006.01)
(Continued)

(52) U.S. Cl.
CPC .......... *G10L 15/183* (2013.01); *G10L 15/063* (2013.01); *G10L 15/18* (2013.01); *G10L 2015/0631* (2013.01); *G10L 2015/226* (2013.01)

(58) Field of Classification Search
CPC ......... G06F 17/27; G06F 17/30; G10L 15/06; G10L 15/26
(Continued)

(56) References Cited

U.S. PATENT DOCUMENTS 5,839,105 A * 11/1998 Ostendorf ............. G10L 15/144
704/256
8,515,736 B1 * 8/2013 Duta ................... G10L 15/1822
704/9
(Continued)

FOREIGN PATENT DOCUMENTS

EP 1 528 538 5/2005
EP 2 541 544 1/2013

OTHER PUBLICATIONS

PCT/US2013/072782, Mar. 11, 2014, International Search Report and Written Opinion.
(Continued)

*Primary Examiner* — Seong Ah A Shin
(74) *Attorney, Agent, or Firm* — Wolf, Greenfield & Sacks, P.C.

(57) ABSTRACT

Techniques for generating language models. The techniques include: obtaining language data comprising training data and associated values for one or more metadata attributes, the language data comprising a plurality of instances of language data, an instance of language data comprising an instance of training data and one or more metadata attribute values associated with the instance of training data; identifying, by processing the language data using at least one processor, a set of one or more of the metadata attributes to use for clustering the instances of training data into a plurality of clusters; clustering the training data instances based on their respective values for the identified set of metadata attributes into the plurality of clusters; and generating a language model for each of the plurality of clusters.

20 Claims, 8 Drawing Sheets

(51) Int. Cl.
*G06F 17/27* (2006.01)
*G10L 15/06* (2013.01)
*G10L 15/183* (2013.01)
*G10L 15/18* (2013.01)
*G10L 15/22* (2006.01)

(58) Field of Classification Search
USPC .......................... 704/9, 235, 243, 245, 257
See application file for complete search history.

(56) References Cited

U.S. PATENT DOCUMENTS

| | | | | |
|---|---|---|---|---|
| 8,713,021 | B2* | 4/2014 | Bellegarda | G06F 17/3071 704/10 |
| 8,812,299 | B1* | 8/2014 | Su | G06F 17/2785 704/1 |
| 9,324,323 | B1* | 4/2016 | Bikel | G10L 15/183 |
| 9,367,526 | B1* | 6/2016 | Vozila | G06Q 10/107 |
| 9,626,960 | B2 | 4/2017 | Vozila et al. | |
| 9,798,393 | B2* | 10/2017 | Neels | G06F 3/04886 |
| 2002/0123891 | A1* | 9/2002 | Epstein | G10L 15/197 704/235 |
| 2003/0187648 | A1 | 10/2003 | Dharanipragada et al. | |
| 2005/0096907 | A1* | 5/2005 | Bacchiani | G06K 9/6226 704/257 |
| 2006/0129397 | A1* | 6/2006 | Li | G10L 15/19 704/245 |
| 2008/0091423 | A1* | 4/2008 | Roy | G10L 15/26 704/235 |
| 2012/0232902 | A1* | 9/2012 | Bocchieri | G10L 15/063 704/243 |
| 2014/0248426 | A1* | 9/2014 | Zardi | B01J 2/16 427/213 |
| 2014/0278426 | A1* | 9/2014 | Jost | G10L 15/063 704/257 |
| 2014/0324434 | A1 | 10/2014 | Vozila et al. | |
| 2016/0048500 | A1* | 2/2016 | Hebert | G06F 17/278 704/9 |

OTHER PUBLICATIONS

PCT/US2013/072782, Nov. 5, 2015, International Preliminary Report on Patentability.
International Search Report and Written Opinion for International Application No. PCT/US2013/072782 dated Mar. 11, 2014.
International Preliminary Report on Patentability for International Application No. PCT/US2013/072782 dated Nov. 5, 2015.
Ballinger et al., On-Demand Language Model Interpolation for Mobile Speech Input. Interspeech-2010. 11$^{th}$ Annual Conference on the International Speech Communication Association. Makuhari, Chiba, Japan. Sep. 26-30, 2010. 1812-15.
Beaufays et al., Unsupervised Discovery and Training of Maximally Dissimilar Cluster Models. Interspeech-2010. 11$^{th}$ Annual Conference of the International Speech Communication Association. Makuhari, Chiba, Japan. Sep. 26-30, 2010. 66-9.
Chen et al., An empirical study of smoothing techniques for language modeling. Proceedings of the 34$^{th}$ annual meeting on Association for Computational Linguistics. 1996. 9 pages.
Daume, Frustratingly Easy Domain Adaption. Conference of the Association for Computational Linguistics (ACL). 2007. 8 pages.
Wessel et al., Robust Dialogue-State Dependent Language modeling using Leaving-One-Out. Proceedings of the 1999. IEEE International Conference on Acoustics, Speech, and Signal Processing. Mar. 15-19, 1999;2:741-44.
Xu et al., Random Forests in Language Modeling. Proceedings of the 2004 Conference on Empirical Methods in Natural Language Processing. 2004. 325-32.

* cited by examiner

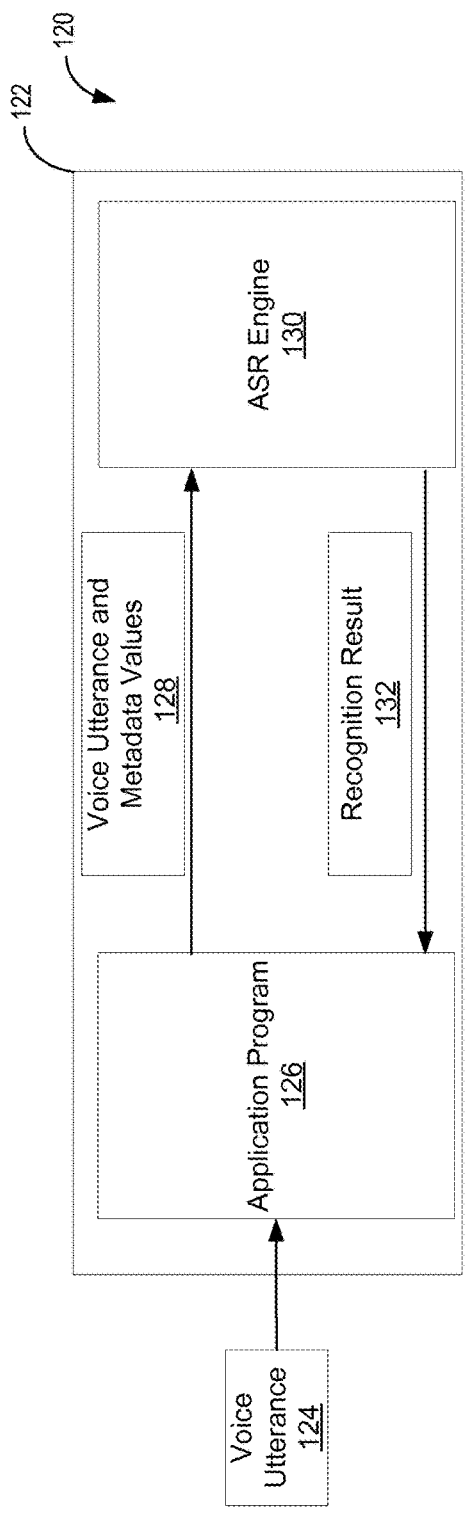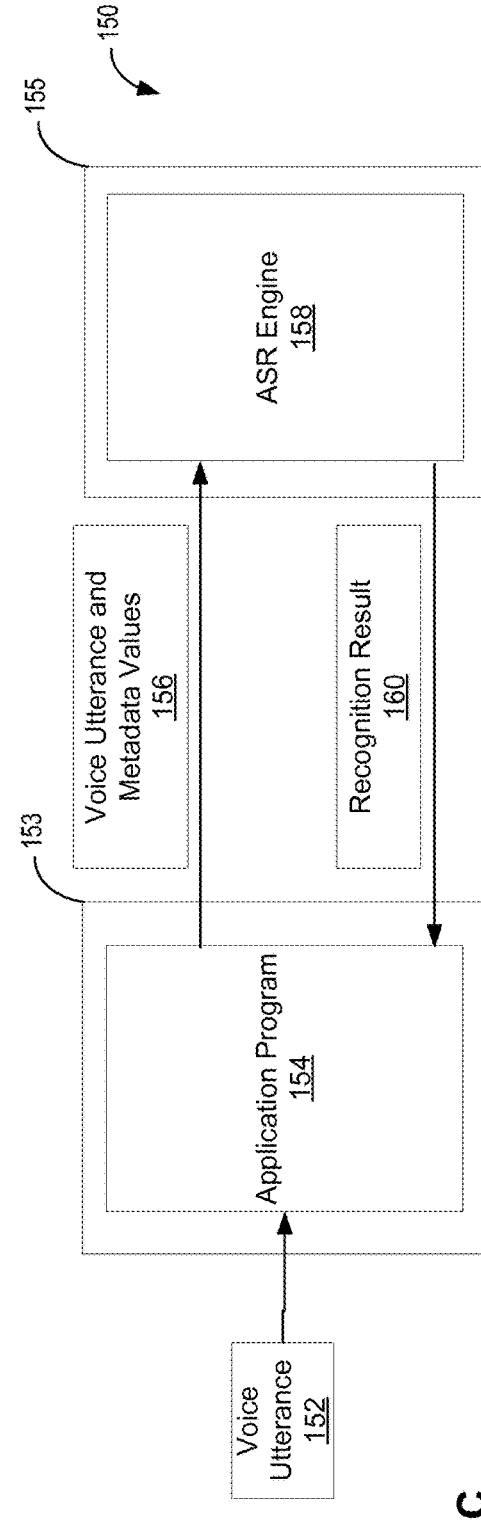
FIG. 1B
FIG. 1C

SYSTEMS AND METHODS FOR PROVIDING METADATA-DEPENDENT LANGUAGE MODELS

RELATED APPLICATIONS

This application is a continuation of and claims priority under 35 U.S.C. § 120 to U.S. application Ser. No. 13/870,356, filed Apr. 25, 2013, titled "SYSTEMS AND METHODS FOR PROVIDING METADATA-DEPENDENT LANGUAGE MODELS," which is incorporated by reference herein in its entirety.

FIELD OF INVENTION

The techniques described herein are directed generally to the field of natural language processing, and more particularly to techniques for providing metadata-dependent language models for use in automatic speech recognition and/or natural language processing applications.

BACKGROUND

Language modeling is used in many language processing applications such as automatic speech recognition (ASR), natural language understanding, information retrieval, and machine translation. Language modeling may involve using labeled or annotated language data to train one or more language models to capture properties of a language. For example, language model(s) may be used to calculate the likelihood that a particular sequence of language segments (e.g., phonemes, words, etc.) occurs in the language.

SUMMARY

Some embodiments provide for a method for generating a plurality of language models. The method comprises acts of: (A) obtaining language data comprising training data and associated values for one or more metadata attributes, the language data comprising a plurality of instances of language data, an instance of language data comprising an instance of training data and one or more metadata attribute values associated with the instance of training data; (B) identifying, by processing the language data using at least one processor, a set of one or more of the metadata attributes to use for clustering the instances of training data into a plurality of clusters; (C) clustering the training data instances based on their respective values for the identified set of metadata attributes into the plurality of clusters; and (D) generating a language model for each of the plurality of clusters.

Other embodiments provide for a system comprising at least one processor configured to perform acts of: (A) obtaining language data comprising training data and associated values for one or more metadata attributes, the language data comprising a plurality of instances of language data, an instance of language data comprising an instance of training data and one or more metadata attribute values associated with the instance of training data; (B) identifying, by processing the language data , a set of one or more of the metadata attributes to use for clustering the instances of training data into a plurality of clusters; (C) clustering the training data instances based on their respective values for the identified set of metadata attributes into the plurality of clusters; and (D) generating a language model for each of the plurality of clusters.

Still other embodiments provide for at least one non-transitory computer-readable storage medium storing processor-executable instructions that, when executed by at least one processor, cause the at least one processor to perform a method comprising acts of: (A) obtaining language data comprising training data and associated values for one or more metadata attributes, the language data comprising a plurality of instances of language data, an instance of language data comprising an instance of training data and one or more metadata attribute values associated with the instance of training data; (B) identifying, by processing the language data, a set of one or more of the metadata attributes to use for clustering the instances of training data into a plurality of clusters; (C) clustering the training data instances based on their respective values for the identified set of metadata attributes into the plurality of clusters; and (D) generating a language model for each of the plurality of clusters.

The foregoing is a non-limiting summary of the invention, which is defined by the attached claims.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same or a similar reference number in all the figures in which they appear.

FIGS. 1A-1C show illustrative environments in which some embodiments may operate.

DETAILED DESCRIPTION

Figure 1A:
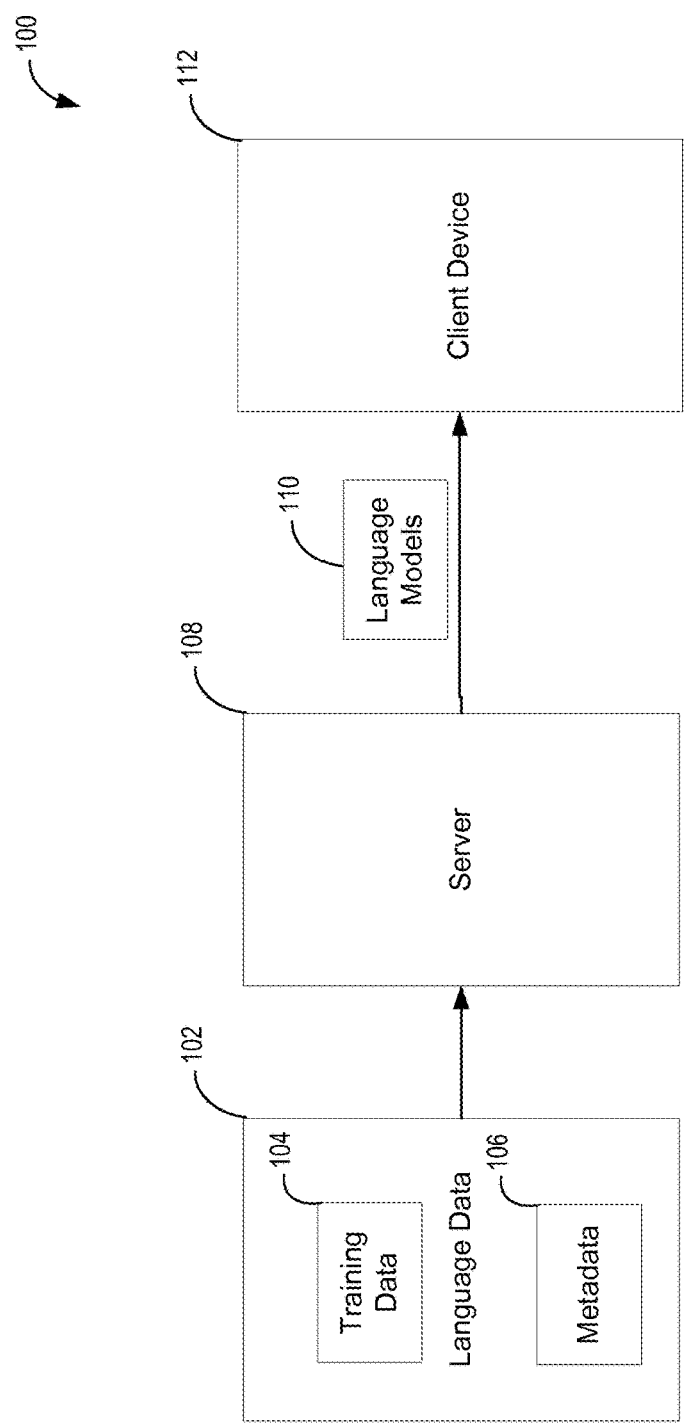

The content of a user's speech varies depending on the context in which the user speaks. For example, the content of the user's speech may vary depending on the application program with which the user is interacting (e.g., a user may be expected to provide different speech input to a web-browser application program than to an e-mail application program), the time when the user is speaking (e.g., a user may be expected to provide different speech input during business hours than outside of business hours), the user's location, and/or any other suitable contextual information, additional examples of which are described below. Because the content of the user's speech may vary depending on the context in which the user speaks, information about the context may be used to help recognize or understand the user's speech. Thus, some embodiments described herein relate to generating language models using both training data and information about the context(s) in which the training data were obtained, and using the generated language models in various natural language processing applications, including automated speech recognition. Using language models generated in this way may lead to improved ASR accuracy, which in turn provides an improved user experience for a user that interacts with a computing device by speaking.

Some embodiments are directed to clustering training data into multiple clusters based at least in part on information about the context in which the training data were obtained, and generating a distinct language model for each of the multiple clusters. When a new voice utterance is obtained along with information about the context in which the new voice utterance was spoken (e.g., metadata at least partially identifying the context), the contextual information may be used to identify a corresponding cluster for the new voice utterance from among the multiple clusters, and the new voice utterance may be recognized at least in part by using the language model for the identified cluster. Given that the language model was generated using training data sharing a similar context with the input, good accuracy can be expected to be achieved by the generated language model in processing the input. Language models generated in accordance with embodiments described herein may be referred to as "metadata-dependent language models."

In some systems, clusters of training data may be created manually by making some assumptions about contextual information that may be used to generate context-dependent language models that may perform well. The inventors have appreciated that such approaches have deficiencies in that they require that an individual manually analyze the available contextual information and make educated guesses about what contextual information will best cluster the training data into clusters that generate context-dependent models that will perform accurately. In addition, the decisions are based on assumption that may prove to be incorrect, so that the context-dependent models may not achieve optimal or even desirable performance.

The inventors have recognized that dynamically identifying which contextual information to use for clustering the training data may result in language models that deliver improved ASR accuracy. In this respect, there are many numerous pieces of contextual information associated with training data and creating clusters using different pieces or combinations of contextual information may result in models that perform very differently. Accordingly, some embodiments are directed to identifying what contextual information to use for clustering the training data. Such contextual information may be identified at least in part by analyzing the training data and information about the contexts in which the training data were obtained. Clusters of training data may then be formed in a manner that depends on both the training data and associated contextual information. As a non-limiting example, training data may comprise text transcriptions of spoken utterances and associated contextual information may be analyzed to determine whether the training data should be clustered based on the times when the utterances were spoken, the location of the computing devices that collected the spoken utterances at these times, and/or the types of the computing devices.

In some embodiments, training data may comprise any suitable data that may be used, alone or in combination with other data, to generate a language model. The training data may comprise multiple instances of training data. A training data instance may comprise information associated with one or more voice utterance(s) including, but not limited to a text transcription of the voice utterance(s). A text transcription of a voice utterance may be obtained by using automatic techniques (e.g., ASR techniques), manual techniques (e.g., human transcription), or both manual techniques and automatic techniques. A training data instance may additionally comprise acoustic data corresponding to the voice utterance. The acoustic data may include the voice utterance, one or more acoustic features derived from the voice utterance, and/or any other suitable acoustic data. A training data instance may comprise any other suitable type of data (e.g., any suitable text, which need not have been derived from the voice utterance), as aspects of the disclosure provided herein are not limited in this respect.

In some embodiments, the training data may be associated with metadata and the metadata may comprise information about the context in which the training data were obtained. For example, a training data instance comprising a text transcription of a voice utterance may be associated with one or more values for one or more metadata attributes, which may provide information about the context in which the utterance was spoken. For example, a training data instance comprising a text transcription of an utterance dictated by speaker into a subject field of an e-mail by using an e-mail application program at 11:30 pm, may comprise the values of "Subject," "E-mail Application Program," and "11:30 pm," respectively, for metadata attributes "Field," "Application Program," and "Time." A training data instance may be associated with values for these and/or any other suitable metadata attributes (examples of which are described below), as aspects of the disclosure provided herein are not limited in any way by the types of metadata that may be provided with training data samples.

Accordingly, in some embodiments, training data comprising multiple training data instances may be obtained, each of the training data instances associated with one or more metadata attribute values. The training data instances may be clustered based on their respective values for a particular set of metadata attributes. In some embodiments, the particular set of metadata attributes used to cluster the training data may be identified automatically based at least in part on an evaluation of the training data instances and associated metadata attribute values. Once the clusters have been determined, a language model may be generated for each of the clusters of training data instances. When a new voice utterance is obtained along with corresponding metadata comprising one or more values for one or more metadata attributes, these value(s) may be used to identify a corresponding cluster for the new voice utterance, and the new voice utterance may be recognized at least in part by using the language model generated for the identified cluster.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as the application is not limited in this respect.

FIG. 1A shows an illustrative computing environment 100 for generating language models based at least in part on training data and associated metadata comprising information about the context in which the training data were obtained. In the illustrated environment, computer 108 may be configured to obtain language data 102 comprising training data 104 and associated metadata 106. Training data 104 comprises a plurality of training data instances. As previously described, each training data instance may comprise information associated with a voice utterance (e.g., a text transcription of the voice utterance) or take any other suitable form. Metadata 106 comprises metadata attribute values corresponding to training data instances in the plurality of training data instances.

Computer 108 may be configured to process language data 102 to identify a set of metadata attributes to use for clustering training data instances in training data 104, cluster the training data instances based on their respective values for the identified set of metadata attributes into multiple clusters, and generate a language model for each of the multiple clusters to obtain language models 110. Language models 110 may be stored at the computer 108 and/or provided to one or more client devices (e.g., client device 112). Computer 108 may be configured to generate any suitable type of language model for a cluster of training data. In some embodiments, computer 108 may be configured to generate a statistical language model for a cluster of training data. For example, computer 108 may generate a unigram language model, a bi-gram language model, a trigram language model, any other suitable n-gram language model, a factored language model, a positional language model, or any other suitable type language model. As another example, computer 108 may generate a mixture language model that is a linear weighted combination of two or more language models of any suitable type. The weights in the linear combination are termed "mixing weights."

Computer 108 may be a server or any other suitable type of computer. In some embodiments, computer 108 may be a distributed computing environment comprising multiple computers. In some embodiments, computer 108 and client device 112 may be the same device.

Client device 112 may be any electronic device that may use a language model (e.g., any device with which a user may interact at least in part by speaking). In some embodiments, client device 112 may be a portable device such as a mobile smart phone, a personal digital assistance, a laptop computer, a tablet computer, or any other portable device with which a user may interact by speaking. Alternatively, client device 102 may be a fixed electronic device such as a desktop computer, a rack-mounted computer, or any other suitable fixed electronic device with which a user may interact by speaking.

Language data 102 may be organized in any suitable way. In some embodiments, language data 102 may comprise multiple language data instances. An instance of language data may comprise an instance of training data and one or more metadata attribute values associated with the instance of training data. As such, language data 102 may be organized in a way that reflects the correspondence among at least some of the instances of training data in training data 104 and associated metadata attribute values in metadata 106.

Figure 2:
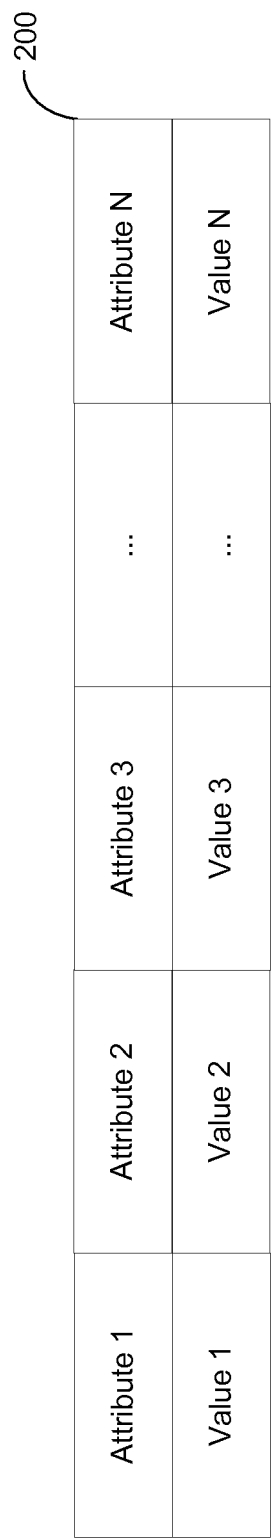
FIG. 2 illustrates a data structure for storing metadata attribute values, in accordance with some embodiments.

Metadata 106 may be organized in any suitable way. In some embodiments, metadata may be organized in metadata attribute-value pairs. The metadata attribute-value pairs may be stored in any suitable format using any suitable data structure or data structures, as aspects of the disclosure provided herein are not limited in this respect. As one non-limiting illustrative example, metadata attribute values may be stored in a table, such as table 200 shown in FIG. 2.

Metadata attributes may take on any of numerous types of values. For example, a metadata attribute may take on a numeric value, a binary value (e.g., True/False), an alphanumeric value (e.g., text), a categorical value, and/or any other type of value, as aspects of the disclosure provided herein are not limited in this respect.

A training data instance, comprising information associated with a voice utterance, may be associated with values for any suitable metadata attributes. These values may represent any suitable type of information. Non-limiting examples of information that may be represented by a value of a metadata attribute for training data instances that represent utterances include, but are not limited to, information identifying the speaker of the utterance, information identifying the computing device to which a speaker provided the utterance by speaking (e.g., an identifier of the computing device, manufacturer of the computing device, model of the computing device, whether the computing device is mobile, etc.), information identifying the time and/or the date of when the utterance was spoken (e.g., time of day, day, month, year, etc.), information about the acoustic environment in which the utterance was received by the device (e.g., inside, outside, noisy, in a car, in a restaurant, etc.), location of the speaker and/or the computing device when the utterance was received by the device, the application program or operating system having the focus of the computing device when the utterance was received, information identifying a user interface element (of an application or operating system in focus) for which the spoken utterance was provided (e.g., the speaker may provide spoken input for a field (e.g., "subject line", "body", "To", etc.) in an application program (e.g., an e-mail application program)), and information related to the state of a dialogue between the speaker and the computing device (e.g., input provided by the speaker to the device and/or output provided by the computing device to the speaker, the prompt the speaker is replying to, an identifier of a state of a dialogue system, etc.). Other types of metadata attribute values are possible for utterances and for other types of training data instances that are not derived from utterances.

Metadata 106 may comprise values for different metadata attributes for different training data instances. Thus, in some embodiments, metadata 106 may comprise values for the same set of metadata attributes for each instance of training data in training data 104. However, in other embodiments, metadata 106 may comprise values for one set of metadata attributes for a first group of one or more training data instances and values for a different set of metadata attributes for a second group of one or more training data instances, as aspects of the disclosure provided herein are not limited in this respect.

FIG. 1B shows an illustrative computing environment 120 for use in connection with automated speech recognition, in accordance with some embodiments. As shown in FIG. 1B, in some embodiments, a client device may execute an automated speech recognition engine, which is a software program that performs ASR on audio data, and an application program and/or an operating system may use the ASR engine to obtain a recognition result of the audio data. The ASR engine may perform automated speech recognition on audio data using one or more acoustic models, one or more language models, and/or any one or combination of suitable speech recognition techniques.

In FIG. 1B, client device 122 executes the application program 126 and an ASR engine 130. When application program 126 (and/or an operating system executing on the client device) receives a speaker-supplied voice utterance 124, it may pass the voice utterance along with corresponding metadata attribute values to ASR engine 130. The application program and/or operating system may obtain the metadata attribute values corresponding to the voice utterance in any suitable way, as aspects of the invention described herein are not limited in this respect. ASR engine 130 may perform automated speech recognition on the voice utterance to obtain a recognition result 132 and may return recognition result 132 to application program 126 for any suitable subsequent use.

In some embodiments, ASR engine 130 may perform automated speech recognition on a voice utterance based at least in part on the metadata attribute values corresponding to the voice utterance. ASR engine 130 may identify, using the metadata attribute values, a language model to use for recognizing the voice utterance. The metadata attribute values may be used to identify a language model generated in accordance with some embodiments of the disclosure provided herein. For example, the metadata attribute values may be used to identify a language model from among language models generated from respective clusters of training data instances formed by using a set of metadata attributes identified by analyzing training data and corresponding metadata. In other embodiments, the metadata attribute values may be used to identify a language model generated in any other suitable way (e.g., language models may be indexed by metadata attribute values).

Some client devices may not have sufficient computing resources to execute an ASR engine that operates with a desired level of accuracy and/or efficiency. That is, for example, a client device may not have sufficient memory to store acoustic models, language models, grammars, and/or other components of such a speech recognizer and/or may not have a processor powerful enough to perform automated speech recognition at a desired level of efficiency. This may occur in any number of situations, such as when the client device is a handheld device, such as a PDA or mobile phone.

Thus, in some embodiments, automated speech recognition of a speaker-supplied voice utterance may be performed at least in part by one or more computers external to the client device. As shown in FIG. 1C, client device 153 executes application program 154. When application 154 (and/or an operating system executing on client device 153) receives a speaker-supplied voice utterance 152, it may pass the voice utterance along with corresponding metadata attribute values to ASR engine 158 executed on one or more other computing devices such as, for example, server 155. ASR engine 158 may perform automated speech recognition of the voice utterance to obtain a recognition result 160 and may return recognition results 160 to application program 154 for any suitable subsequent use.

In the example of FIG. 1B, automatic speech recognition on audio data received at a client device is performed on the client device, and in the example of FIG. 1C, audio data is provided from the client device to one or more other computing devices (e.g., one or multiple servers, a collection of distributed computers of any suitable type, one or more devices part of a cloud computing environment, etc.) and the other computing device(s) perform automatic speech recognition. However, in some embodiments, automatic speech recognition may be performed partially by the client device and partially by the other computer(s). For example, a portion of an ASR process may be performed on the client and a portion may be performed on the other computing device(s). This may be done, for example, to enable the client device to perform a portion of the speech recognition process, but leave computationally intensive portions for the other computing device(s).

It should be appreciated that the techniques described herein are not limited to being used for automatic speech recognition and may be used with any process that may use a language model for any suitable application.

Figure 3:
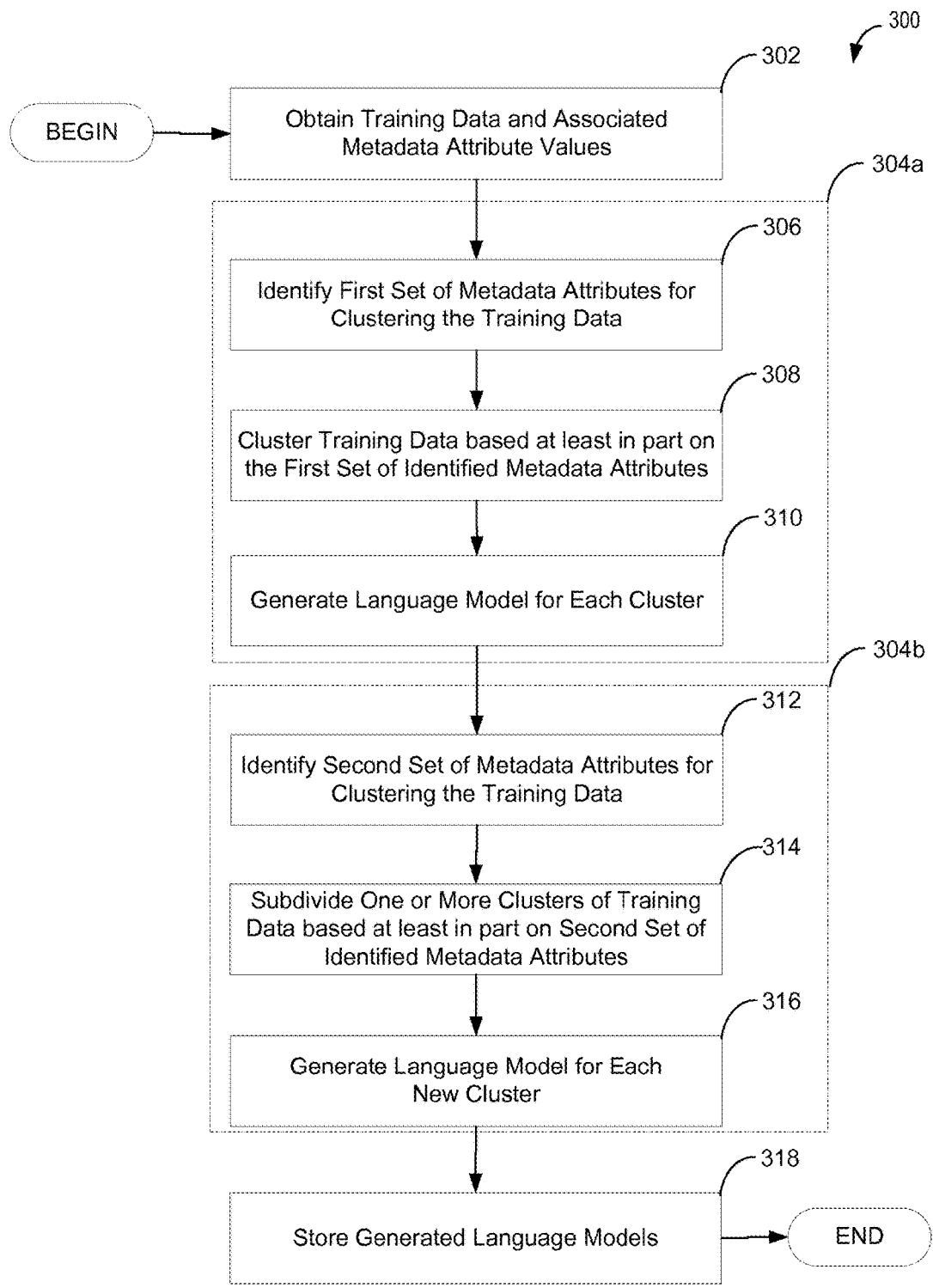
FIG. 3 is a flow chart of an illustrative process for generating language models from training data and corresponding metadata, in accordance with some embodiments.

As previously described, in some embodiments training data and corresponding metadata may be used to cluster the training data into multiple clusters and generate a language model for each of the multiple clusters. One such embodiment is illustrated in FIG. 3, which shows a flow chart of an illustrative process 300 that can be performed, e.g., by computer 108 described with reference to FIG. 1A or by any other suitable computing device(s).

Process 300 begins at act 302, where language data comprising training data and associated metadata attribute values is obtained. The language data may be obtained from any suitable source or sources, as aspects of the disclosure provided herein are not limited in this respect. As previously described, the training data may comprise multiple instances of training data, each of which may comprise information associated with one or more voice utterances including, but not limited to, a text transcription of the voice utterance(s) or some other type of training data not associated with a voice utterance. Each training data instance may be associated with one or more values for one or more metadata attributes. The metadata attribute values may represent any suitable type of information, examples of which have been described.

Process 300 next proceeds to a first training stage 304a comprising acts 306, 308, and 310. At act 306, a first set of one or more metadata attributes for clustering the training data instances is identified. In some embodiments, each of the attributes in the first set of metadata attributes may be identified based at least in part on the training data instances and the corresponding metadata attribute values. This may be done in any suitable way and, for example, may be done with reference to illustrative process 500 described below with reference to FIG. 5. For example, the first set of metadata attributes may be identified at least in part by dividing the training data instances into two or more groups based on their respective values for a candidate set of one or more metadata attributes and calculating a measure of goodness of fit (e.g., a likelihood) of language models (e.g., unigram language models) generated for the resultant groups.

In other embodiments, some of the attributes in the first set of metadata attributes may be identified based at least in part on the training data instances and corresponding metadata attribute values, while other metadata attributes may be identified in other ways (e.g., independently of the training data and corresponding metadata values).

After the first set of metadata attributes is identified at act 306, process 300 proceeds to act 308, where the training data instances are clustered based at least in part on the identified first set of metadata attributes. Training data instances may be clustered based on their respective values for the attributes in the first set of metadata attributes. This may be done using any suitable clustering technique or techniques including, but not limited to, hard clustering (e.g., k-means or exchange-based clustering) and soft clustering (e.g., probabilistic latent semantic analysis, latent Dirichlet allocation).

In some embodiments, training data instances may be clustered using an iterative clustering technique. Any suitable iterative clustering technique may be used, one non-limiting example of which is a decision tree clustering technique. In embodiments where an iterative clustering technique is used, the first set of metadata attributes identified at act 306 may be used to iteratively divide training data instances to generate clusters of training data instances. For example, the training data instances obtained at act 302 may be divided into two or more groups based on their corresponding values for one metadata attribute in the first set of metadata attributes. Each of the groups so obtained may be further subdivided into two or more subgroups using another metadata attribute in the first set of metadata attributes. Each of the obtained subgroups may be further divided into two or more sub-sub-groups using yet another metadata attribute in the first set of metadata attributes, and so on until the iterative clustering stops based on any suitable stopping criterion (e.g., all the attributes in the first set of metadata attributes have been used). The clusters of training data instances correspond to the groups obtained after the last such iteration.

Training data instances may be divided into two or more groups based on their respective values for a metadata attribute in any suitable way. For example, the metadata attribute may take on numeric values and the training data instances may be divided into groups based on whether their respective values for the metadata attribute are below/above a specified threshold (e.g., is the time of day when an utterance was spoken before or after 5 pm?) or fall into specified numerical ranges (e.g., is the time of day when an utterance was spoken in the morning hours of 5 am-9 am, business hours of 9 am-5 pm, evening hours of 5 pm-11 pm, or at night in the hours of 11 pm-5 am). As another example, the metadata attribute may take on categorical values and the training data instances may be divided into groups based on which of the categories their values fall into (e.g., is the application program to which a spoken utterance was provided an e-mail application program, a web-browsing application program, a contacts application program, an application program for showing maps, an application program for playing media, etc.). As yet another example, the values that the metadata attribute may take on may be divided into multiple sets, and the training data instances may be divided into groups based on which of the sets their respective values for the metadata attribute fall in.

In some embodiments, the manner in which training data instances may be divided into groups for a particular metadata attribute may be dynamically determined by analyzing the training data instances and/or the corresponding values for the metadata attribute. This is described below with reference to FIG. 5. In other embodiments, the manner in which training data instances may be divided into groups for a particular metadata attribute may be determined independently of the training data instances and/or their respective values for the metadata attribute (e.g., they may be determined a priori without analyzing the training data samples).

It should be appreciated that clustering training data instances using an iterative clustering technique may lead to the formation of different clusters depending on the order in which the metadata attributes are used to divide the training data instances and the manner in which the training data instances are divided for a particular metadata attribute. Accordingly, when an iterative clustering technique is used to cluster the training data instances, information specifying the order in which the metadata attributes in the first set of attributes may be used to divide the training data instances into groups and information specifying the manner in which the training data instances are to be divided for each of the metadata attributes may be obtained as part of the act 306.

As mentioned above, in some embodiments, a decision tree clustering technique may be used to cluster the training data instances obtained at act 302. In such embodiments, the training data instances may be clustered at least in part by using a decision tree (embodied as one or multiple data structures storing information represented by the decision tree) that specifies which metadata attributes to use for iteratively dividing the training data instances into groups, the order in which these metadata attributes are to be used when dividing the training data instances into groups, and the manner in which training data instances are to be divided into groups for each of the specified metadata attributes.

In some embodiments, a decision tree may comprise a hierarchy of nodes having a root node at the top level of the hierarchy and leaf nodes at the bottom level of the hierarchy. Nodes in the decision tree that are not leaves may be referred to as "internal" nodes. An internal node in the decision tree may represent a metadata attribute that may be used for clustering training data instances. Additionally, an internal node may represent information specifying the manner in which training data instances are to be divided for the metadata attribute represented by the internal node. The structure of the internal nodes in the decision tree may represent the order in which the metadata attributes represented by the internal nodes are to be used for dividing the training data instances into groups. Such a decision tree may be obtained in any suitable way and, in some embodiments, may be obtained as part of act 306 of process 300.

Figure 4:
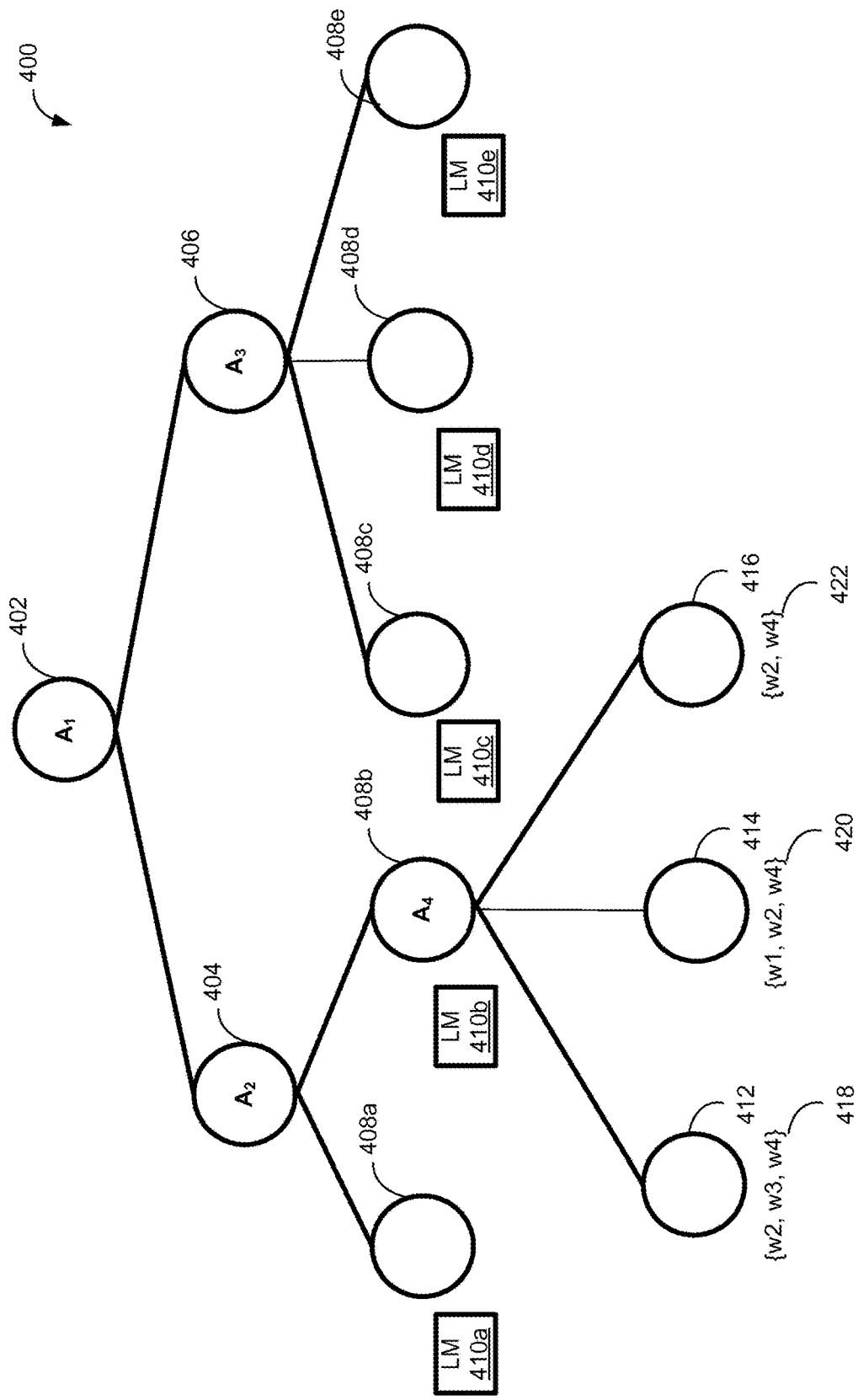
FIG. 4 illustrates an example of generating language models, in accordance with the illustrative process of FIG. 3.

FIG. 4 shows an illustrative example of decision tree 400 that may be used to iteratively cluster training data instances. Decision tree 400 comprises internal nodes 402, 404, 406, and 408b representing metadata attributes $A_1$, $A_2$, $A_3$, and $A_4$, respectively. The structure of the internal nodes of decision tree 400 indicates the order in which the metadata attributes are to be used for iteratively dividing the metadata into groups. (As discussed below, the groups obtained depend on the order in which the metadata attributes are used). In the illustrated example, training data instances may be first divided into two groups (corresponding to nodes 404 and 406, respectively) based on the values of the training data instances for the metadata attribute $A_1$. The group of training data corresponding to node 404 may be further divided into two groups (corresponding to nodes 408a and 408b, respectively) based on the values of the training data instances (in the group corresponding to node 404) for the metadata attribute $A_2$. The group of training data corresponding to node 406 may be further divided into three groups (corresponding to nodes 408c, 408d, and 408e, respectively) based on the values of the training data instances (in the group corresponding to node 406) for the metadata attribute $A_3$. The group of training data corresponding to node 408b may be further divided into three groups (corresponding to nodes 412, 414, and 416, respectively) based on the values of the training data instance (in the group corresponding to node 408b) for the metadata attribute $A_4$.

As may be appreciated from the foregoing, different clusters of training data may be obtained by using different sets of metadata attributes. In the example of FIG. 4, for instance, the clusters of training data corresponding to nodes 412, 414, and 416 were obtained based on respective values of training data instances for the metadata attributes $A_1$, $A_2$ and $A_4$, whereas the clusters of training data corresponding to nodes 408c, 408d, and 408e were obtained based respective values of training data instances for the metadata attributes $A_1$ and $A_3$. As such, some clusters of training data instances may be obtained based on their respective values for some, but not all of the metadata attributes for which these training data instances have values. For example, training data instances corresponding to cluster 408c were assigned to that cluster based on their respective values for the metadata attributes $A_1$ and $A_3$, but not on their respective values for the metadata attributes $A_2$ and $A_4$.

Regardless of the clustering technique(s) used to cluster the training data instances at act 308, after the training data instances are clustered, process 300 proceeds to act 310, where a language model is generated for each cluster of training data instances. A language model for a cluster may be generated using the training data instances in the cluster using any suitable language model generation technique, as aspects of the disclosure provided herein are not limited in this respect. Any suitable type of language model may be generated for each cluster, examples of which have been provided. The language models generated at act 310 (in the first training stage 304a) of process 300 are referred to herein as "basis language models."

The example shown in FIG. 4 illustrates the first training stage 304a of process 300. In the example, metadata attributes $A_1$ $A_2$ and $A_3$ are identified at act 306 of process 300. Then, at act 308, these identified metadata attributes are used to iteratively cluster the training data instances obtained at act 302 to obtain clusters of training data corresponding to nodes 408a-408e of decision tree 400. Then, at act 310, basis language models 410a-410e are generated for each of the clusters of training data corresponding to nodes 408a-408e.

In the illustrative example of FIG. 4, the training data instances are clustered based on their respective values for three metadata attributes during the first training stage 304a. However, the training data instances may be clustered based on their respective values for any suitable number of metadata attributes (e.g., two, four, five, six, seven, etc.) during the first training stage, as aspects of the disclosure provided herein are not limited in this respect. Moreover, although in the illustrative example of FIG. 4, the training data instances were clustered to produce five clusters during the first training stage, the training data instances may be clustered into any suitable number of clusters (e.g., at least two, at least four, at least eight, at least sixteen, at least thirty-two, etc.) during the first training stage, as aspects of the disclosure provided herein are not limited in this respect.

In some embodiments, each of the clusters generated in the first training stage 304a may comprise a sufficient number of training data instances to generate a language model having good performance. However, if the clusters obtained at act 308 were to be subdivided into smaller clusters, one or more of these smaller clusters may not contain a sufficient number of training data instances to generate a corresponding language model having good performance. On the other hand, the content of the training data instances in one or more of the clusters obtained at act 308 may be clustered, naturally, into one or more smaller clusters (e.g., the content of the training data instances one of the clusters may vary substantially based on values of one or more other metadata attributes not in the first set of metadata attributes identified at act 304). Thus, although it may be desirable to further cluster the training data based on its content, there may not be enough training data in the resulting clusters to obtain language models having good performance. The inventors have appreciated that the above-described problem may be addressed by generating a mixture of basis language models for any cluster of training data obtained, in the second training stage 304b, from further subdividing one or more clusters obtained at act 308. Even if such a cluster does not contain sufficient training data to estimate all the parameters of a language model, the cluster may have sufficient training data to estimate the mixing weights of a mixture of basis language models generated at act 310 of process 300.

In addition, as described above, clusters of training data instances obtained during the first training stage 304a, at act 306, may be obtained using metadata attributes identified at least in part by dividing the training data instances into two or more groups based on their respective values for a candidate set of one or more metadata attributes and calculating a measure of goodness of fit of unigram language models generated for each of the resultant groups. Unigram models may be used to reduce the amount of computational resources utilized in the first training stage. However, generating more complex language models (e.g., mixtures of the basis language models obtained at act 310) for clusters of training data instances may result in language models that deliver improved ASR accuracy.

Accordingly, in some embodiments, after the basis language models are generated in the first training stage 304a, process 300 proceeds to the second training stage 304b, where at least one cluster obtained at act 308 is divided into smaller clusters and a mixture of basis language models is generated for each of the smaller clusters.

Second training stage 304b comprises acts 312, 314, and 316. At act 312, a second set of one more metadata attributes for further clustering the training data is identified. The second set of metadata attributes may be used to further subdivide one or more clusters of training data instances, obtained at the end of the first training stage 304a, into one or more new clusters. The second set of metadata attributes may be identified in any suitable way and, for example, may be identified using the techniques described above with reference to act 306.

Next, process 300 proceeds to act 314, where the clusters of training data instances obtained in the first training stage 304a are further subdivided using the second set of metadata attributes to obtain new clusters of training data instances. This may be done in any suitable way and, for example, may be done by using techniques described above with reference to act 308.

Next, process 300 proceeds to act 316, where a language model is generated for each of the new clusters obtained at act 314 of process 300. In some embodiments, a mixture language model may be generated for a new cluster with the mixture language model being a weighted linear combination of the basis language models generated at act 310 of process 300. In other embodiments, any other suitable type of language model may be generated for a new cluster.

In some embodiments, generating a language model that is a mixture of basis language models for a new cluster of training data instances may comprise computing mixing weights for the basis language models generated at act 310. The mixing weights may be computed at least in part by using the training data instances in the new cluster or in any other suitable way.

The mixing weights may be computed using any suitable technique. In some embodiments, the mixing weights may be computing by using an expectation-maximization (EM) algorithm. In some embodiments, the mixing weights may be computed subject to a ("sparsity") constraint limiting the number of mixing weights that may take on non-zero values to a specified number (e.g., no more than two mixing weights have non-zero values, no more than three mixing weights have non-zero values, etc.). In this way, the generated mixture language model may comprise a small number (e.g., two, three, etc.) of components reducing the computational cost of using these language models in automated speech recognition (e.g., by reducing the computational cost of decoding).

The illustrative example of FIG. 4 also illustrates generating language models in the second training stage 304b of process 300. In the example, metadata attribute $A_4$ is identified, at act 312 of process 300, for further dividing the cluster of training data instances corresponding to node 408b into one or more new clusters. At act 314, the training data instances corresponding to node 408b are divided into clusters corresponding to nodes 412, 414, and 416, respectively. Then, at act 316, mixture language models are generated for each of these new clusters of training data instances. Each mixture language model is a weighted mixture of two or more basis language models 410a-410e. The mixture language model generated for the cluster corresponding to node 412 is a weighted linear combination of basis language models 410b, 410c, and 410e, weighted by mixing weights 420. The mixture language model generated for the cluster corresponding to node 414 is a weighted linear combination of basis language models 410a, 410b, and 410d, weighted my mixing weights 420. The mixture language model generated for the cluster corresponding to node 416 is a weighted linear combination of basis language models 410b and 410e, weighted my mixing weights 422.

Although, in the illustrative example of FIG. 4, only one of the clusters of training data instances formed in the first training stage (i.e., cluster 408b) was further subdivided in the second training stage to form one or more new clusters of training data instances, any suitable number of clusters (e.g., all clusters, at least two clusters, at least four clusters, etc.) may be further subdivided in the second training stage to form one or more new clusters, as aspects of the disclosure provided herein are not limited in this respect. Any suitable number of new clusters (e.g., at least two, at least four, at least eight, at least sixteen, at least thirty-two, etc.) may be formed in the second training stage.

After the second training stage 304b completes, process 300 proceeds to act 318, where the generated language models are stored. In some embodiments, the generated language models may be stored locally on the device executing process 300 (e.g., computer 108) or remotely at a location accessible by the computing device. In some embodiments, the generated language models may be stored on one or more client devices (e.g., client device 112) that may use the generated language models to perform automated speech recognition. After the generated language models are stored, process 300 completes.

In some embodiments, generated language models may be stored along with information about the clusters of training data instances used to generate the language models. For example, if the training data instances were clustered based on their respective values for a sequence of metadata attributes, information indicating the order in which the metadata attributes were used to cluster the training data instances may be stored. Additionally, information specifying the manner in which the training data instances were divided for each of the metadata attributes may be stored. In embodiments where a decision tree clustering technique was used to cluster the training data, the decision tree may be stored. For example, one or more data structures storing information represented by the decision tree may be stored.

It should be appreciated that process 300 is merely illustrative and that variations of process 300 are possible. For example, in some embodiments, the second training stage 304b may be omitted and only the basis language models may be generated and stored as part of process 300. As another example, in some embodiments, after the basis language models are generated at act 310, the training data instances obtained at act 302 and/or additional training data instances (e.g., training data utterances comprising information associated with new voice utterances and corresponding metadata attribute values) may be clustered, using any suitable clustering scheme (e.g., soft clustering, hard clustering, etc.), to obtain new clusters of training data instances. A mixture of the basis language models may be generated for each of these new clusters (e.g., as described with reference to act 316 or in any other suitable way). Generating mixtures of basis language models for training data that includes more recently observed data may allow to take into account any changes to metadata attribute values over time (e.g., the name of a field in an application program may change between different versions of that application program) when generating language models.

Figure 5:
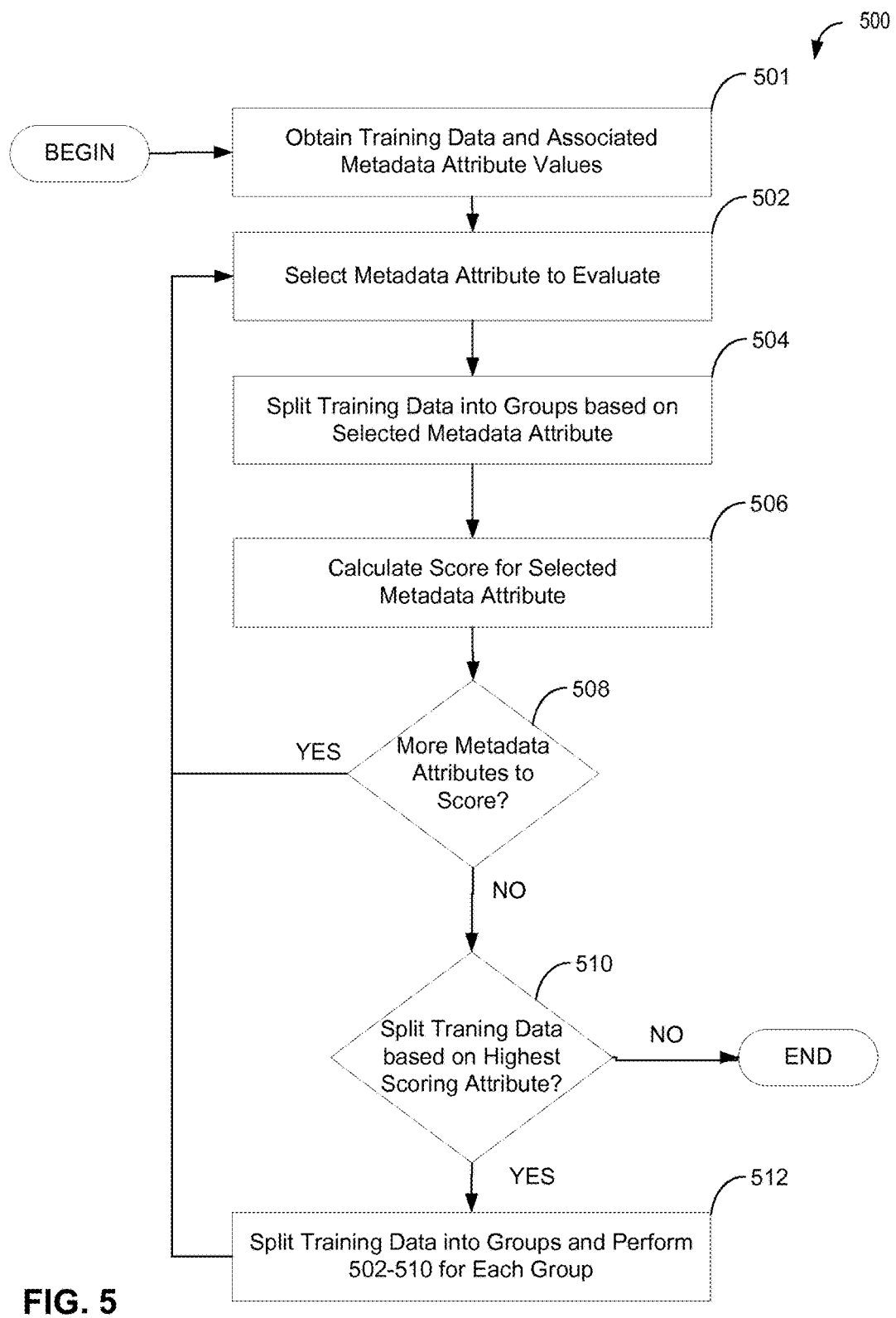
FIG. 5 is a flow chart of an illustrative process for identifying metadata attributes to use for clustering training data, in accordance with some embodiments.

As described above, in acts 306 and 312 of process 300, groups of metadata attributes to use for clustering the training data instances may be identified automatically based at least in part on the training data instances and the associated metadata attribute values. One such embodiment is illustrated in FIG. 5, which shows a flow chart of an illustrative process 500 for identifying metadata attributes to use for clustering training data instances. Illustrative process 500 may be performed by computer 108 of FIG. 1A or by any suitable computing device(s). As described above, process 500 may be used as part of acts 306 and 312 of process 300.

The process 500 is recursive. After one metadata attribute for clustering the training data instances is identified (in ways discussed below), this identified metadata attribute is used to divide the training data instances into two or more groups and the process 500 may be repeated for each of the groups of training data instances so obtained. In the example of FIG. 4, for instance, after attribute $A_1$ is identified as an attribute for clustering the training data instances, the training data instances may be divided into two groups based on attribute $A_1$ and other metadata attributes are identified for further clustering each of the obtained groups of instances.

Process 500 begins at act 501, where training data instances and associated metadata attribute values are obtained. In embodiments in which process 500 is used as part of act 306 of process 300, the obtained training data instances and associated metadata attribute values may be those obtained at act 302 of process 300. In embodiments in which process 500 is used as part of act 312 of process 300, the obtained training data instances and associated metadata values may be those that correspond to any one of the clusters generated at act 308 of process 300. In the example of FIG. 4, for instance, the training data instances (and associated metadata attribute values) corresponding to node 408b may be obtained as part of act 501. However, training data instances and associated metadata attribute values may be obtained in any other suitable way, as aspects of the disclosure provided herein are not limited in this respect.

Next process 500 proceeds to act 502, where a metadata attribute is selected for evaluation. Any metadata attribute for which at least some of the training data instances have associated values may be selected act 502. In the example of FIG. 4, any one of attributes $A_1$, $A_2$, $A_3$, and $A_4$ may be selected for evaluation. The selection may be performed in any suitable way (e.g., at random, in a previously determined order, etc.). In this respect, as discussed below, process 500 may proceed through multiple iterations (e.g., via the YES branch of decision block 508) so that, in some embodiments, each metadata attribute is eventually selected for evaluation and the order of selection does not matter. The results of the evaluation, which may be performed in ways discussed below, may be used to determine whether the selected metadata attribute is to be used for clustering training data to generate metadata-dependent language models.

Next, process 500 proceeds to act 504, where the selected metadata attribute is used to divide the training data instances into two or more groups based on the respective values of the training data instances for the selected metadata attribute. This may be done in any suitable way. In some embodiments, the groups of training data instances may be obtained by clustering the training data instances into groups based at least in part on their respective values for the selected metadata attribute. The clustering may be performed by any suitable clustering technique (e.g., exchange-based clustering or any other suitable clustering technique), examples of which have been provided. In some embodiments, when the selected metadata attribute takes on numeric values, the training data instances may be divided into two or more groups based on whether their respective values for the selected attribute fall below/above a threshold. The threshold may be specified in advance or determined by analyzing the metadata attribute values, as known in the art of decision trees. Alternatively, the training data instances may be divided into groups using any other suitable technique (e.g., divide into predetermined groups), as aspects of the disclosure provided herein are not limited in this respect.

As one non-limiting example, the metadata attribute selected at act 502 may be "Time," with values of this attribute representing a time when an utterance was spoken. At act 504, the values for the "Time" attribute, obtained at act 501, may be clustered to obtain four time ranges (e.g., 4:43 am-8:30 am, 8:30 am-6:04 pm, 6:04 pm-9 pm, and 9 pm-4:43 am). That is, these four time ranges are identified automatically by clustering training data values for the attribute "Time." The training data instances may then be divided into four groups based on into which of the four time ranges the respective values of the training data instances for the "Time" attribute fall. Alternatively, the training data instances may be divided into groups based on into which of the predetermined (e.g., manually specified by a person) time ranges (e.g., morning hours of 5 am-9 am, business hours of 9 am-5 pm, evening hours of 5 pm-11 pm, or at night in the hours of 11 pm-5 am) the respective values of the training data instances for the "Time" attribute fall.

Next process 500 proceeds to act 506, where the split of the training data into groups obtained at act 504 for the attribute selected at act 502 is evaluated and a score representing the result of the evaluation is calculated for the selected metadata attribute. In some embodiments, the evaluation may be performed by: (1) generating a "child" language model for each of the groups of training data obtained at act 504; (2) generating a "parent" language model using all the training data instances that were divided to form the groups obtained at act 504; and (3) calculating a score representing the result of the evaluation based at least in part how a measure of the goodness of fit of the generated "child" language models compares with a measure of the goodness of fit of the "parent" language model. The score may be calculated as a ratio of the measures of goodness of fit, a difference of the measures of goodness of fit, or in any other suitable way. The score provides a quantitative measure of the improvement (if any) in goodness of fit of the child language models to the training data instances used to train them as compared with the goodness of fit for all of the training data and one single parent language model. The closer the fit for a language model to its training data, the better the expected performance for the language model may be.

In some embodiments, the evaluation may be performed by generating a unigram language model for each of the groups of training data obtained at act 504 (i.e., each of the above-described "child" language models and the "parent" language model would be a unigram model). For example, unigram language models may be generated when process 500 is used to identify the first set of metadata attributes at act 304 of process 300 (during the first training stage). In this way, the amount computational of resources used to perform process 500 may be reduced. However, in other embodiments, any other suitable type of language model (e.g., an n-gram model for any value of n greater than or equal to two, a mixture of language models, etc.) may be generated as part of the evaluation performed at act 506. For example, the evaluation may be performed by generating a mixture language model (e.g., a mixture of basis language models obtained at act 310 of process 300) for each of the groups of training data obtained at act 504, as may be done, for example, when process 500 is used to identify the second set of metadata attributes at act 312 of process 300 (during the second training stage).

In some embodiments, the measure of goodness of fit of a language model may be calculated at least in part by calculating the likelihood, according to the language model, of the training data from which the language model was generated. The above-described likelihood may be calculated as a log-likelihood or any other suitable monotonic function of the likelihood. In other embodiments, the goodness of fit may be calculated using a chi-squared statistic, an R-squared statistic, information theoretic measures (e.g., Kullback-Liebler divergence, mutual information, entropy, etc.), or any other suitable techniques, as aspects of the disclosure provided herein are not limited in this respect.

After a score is calculated at act 506, for the metadata attribute selected at act 502, process 500 proceeds to decision block 508, where it is determined whether there are more metadata attributes to score. If a metadata attribute that may have been selected at act 502 has not yet been scored, it may be determined that there are more metadata attributes to score. If so, process 500 returns to act 502, where a metadata attribute that has not yet been scored may be selected for evaluation.

Conversely, when it is determined that there are no more metadata attributes to score, process 500 proceeds to decision block 510, where the metadata attribute having the highest score is identified and a determination is made as to whether the training data instances should be divided based on the identified metadata attribute. This determination may be made in any suitable way. For example, it may be determined that if the score of the highest-scoring metadata attribute exceeds a threshold, the training data instances should be divided based on the highest-scoring metadata attribute. In this way, training data instances may be divided into groups when that division leads to a large enough improvement in fit of child language models to the groups of training data instances obtained as a result of the division as compared with the goodness of fit one single parent language model for all of the undivided training data. As another example, it may be determined that the training data instances should be divided based on the highest-scoring metadata attribute when the number of groups of training data instances into which the training data instances obtained at act 501 have been divided is below a threshold. In this way, the increased use of computational resources that would result from generating and evaluating language models for a very large number of language models may be avoided. As yet another example, it may be determined that the training data instances should not be divided into groups when the number of training data instances in at least one of the groups obtained from the split would be below a threshold number of training data instances below which there are too few training data instances to use for generating a language model having an expected good performance.

When it is determined, at decision block 510, that the training data instances are not to be divided into groups, process 500 completes. On the other hand, when it is determined, at decision block 510, that the training data instances are to be divided into groups based on the metadata having the highest score, the training data instances are divided into groups based on their respective values for the highest-scoring metadata attribute, at act 512, and the process returns to act 502. Acts 502-506 and decision blocks 508-510 are then repeated for each of the obtained groups of training data instances. When decision block 510 is performed for a particular one of the obtained groups, it is either determined that the particular group should be further split into subgroups (with acts 502-506 and decision blocks 508-510 repeated for each of these subgroups) or that branch of process 500 ends. In this way, process 500 is recursive, as described above.

The manner in which process 500 may be used to construct decision tree 400 shown in FIG. 4 illustrates the way in which process 500 is recursive. Initially, after obtaining training data instances and corresponding metadata attribute values, at act 501, each of attributes $A_1$, $A_2$, $A_3$ and $A_4$ is evaluated (in any suitable order), in respective iterations of acts 502-506 and decision block 508 of process 500, to determine which of these metadata attributes is to be used first for dividing training data instances into groups. In the illustrative example, the highest score is computed for metadata attribute $A_1$. After it is determined at decision block 510 that the training data instances should be split based on metadata attribute $A_1$, the training data instances are split, based on their respective values for metadata attribute $A_1$, into two groups corresponding to nodes 404 and 406, respectively. Process 500 then branches based on the results of the split: acts 502-506 and decision blocks 508-510 are repeated for the group of training data instances corresponding to node 404 and, separately, for the group of training data instances corresponding to node 406.

Accordingly, in one recursive branch of process 500, each of attributes $A_2$, $A_3$, and $A_4$ is evaluated (in any suitable order) in respective iterations of acts 502-506 and decision block 508 of process 500, to determine which of these metadata attributes is to be used for dividing the group of training data instances corresponding to node 404 into subgroups of training data instances. The highest score is computed for metadata attribute $A_2$. After it is determined at decision block 510 that the training data instances corresponding to node 404 should be further split based on their respective values for metadata attribute $A_2$, these training data instances are split into two groups corresponding to nodes 408a and 408b, respectively. Process 500 then continues based on the results of the split: acts 502-506 and decision blocks 508-510 are repeated for the group of training data instances corresponding to node 408a and, separately, for the group of training data instances corresponding to node 408b. When decision block 510 is performed for the training data instances corresponding to node 408a, it is determined that these training data instances should not be split (e.g., because the highest score of the highest scoring of the remaining attributes $A_3$ and $A_4$ does not exceed a threshold). When decision block 510 is performed for the training data instances corresponding to node 408b, it is determined that these training data instances should be split into groups based on the metadata attribute $A_4$. The training data instances corresponding to node 408b are then split based on their respective values for the metadata attribute $A_4$ to obtain three groups of training data instances corresponding to nodes 412, 414, and 416, respectively. Acts 502-506 and decision blocks 508-510 are then repeated for each of these three groups of training data instances, but it is determined that none of these groups is to be split further.

In another recursive branch of process 500, each of attributes $A_2$, $A_3$, and $A_4$ is evaluated (in any suitable order) in respective iterations of acts 502-506 and decision block 508 of process 500, to determine which of these metadata attributes is to be used for dividing the group of training data instances corresponding to node 406 into subgroups of training data instances. The highest score is computed for metadata attribute $A_3$. After it is determined at decision block 510 that the training data instances corresponding to node 406 should be further split based on their respective values for metadata attribute $A_3$, these training data instances are split into three groups corresponding to nodes 408c, 408d, and 408e, respectively. Acts 502-506 and decision blocks 508-510 are then repeated for each of these three groups of training data instances, but it is determined that none of these groups is to be split further.

As may be appreciated from the foregoing, process 500 identifies not only the metadata attributes to use for clustering training data instances that will result in the best fit to the training data (and assumedly the best language model performance), but also the order in which these metadata attributes are to be used for clustering the training data. That order is implied by the order in which the metadata attributes are identified in the recursion of process 500. For example, training data instances corresponding to nodes 412, 414, and 416 are obtained by splitting the training data instances, obtained at act 501, based on their respective values for the attribute $A_1$, splitting one of the resulting groups of training data instances based on their respective values for the attribute $A_2$, and splitting one of the resulting subgroups of training data instances based on their respective values for the attribute $A_4$.

A2, and A4, in that order. As another example, training data instances corresponding to node 408e are obtained by splitting the training data instances, obtained at act 501, based on their respective values for the metadata attributes A1 and A3, in that order.

Figure 6:
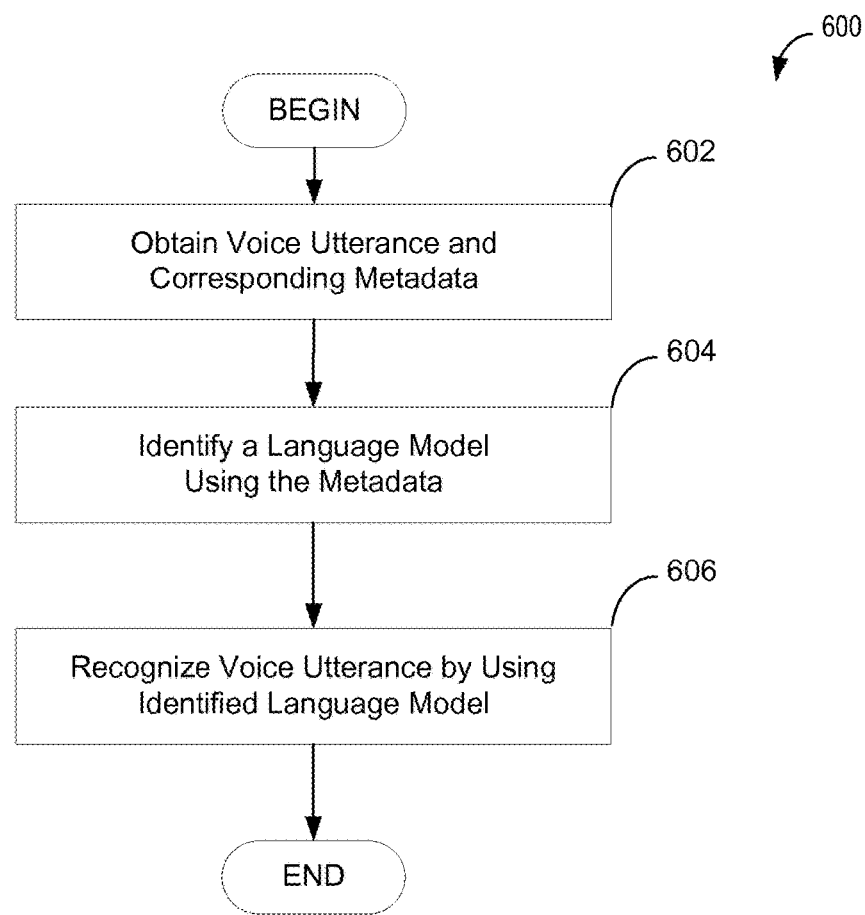
FIG. 6 is a flow chart of an illustrative process for performing automatic speech recognition, in accordance with some embodiments.

As previously described, in some embodiments, metadata-dependent language models may be used in various language processing applications including, but not limited to, automated speech recognition. One such embodiment is illustrated in FIG. 6, which shows a flow chart of an illustrative process 600 for performing automatic speech recognition. Illustrative process 600 may be performed by a client device (e.g., client device 122) alone, by at least one server (e.g., server 155), or partially by a client device and partially by at least one server (e.g., client device 153 and server 155).

Process 600 begins at act 602, where a voice utterance and one or more corresponding metadata attribute values are obtained. The voice utterance and corresponding metadata value(s) may be obtained from any suitable source(s) in any suitable way. In some embodiments, the voice utterance may be provided by a speaker to an application program or operating system executing on the device executing process 600 (e.g., client device 122 illustrated in FIG. 1B). The application program or operating system may obtain the metadata attribute value(s) corresponding to the voice utterance, in response to receiving the voice utterance. This may be done in any suitable way. For example, the application program or operating system may access information available on the client device to obtain the metadata attribute value(s). In other embodiments, the voice utterance and corresponding metadata values may be provided to the device executing process 600 (e.g., server 155) from another device (e.g., client device 153), as illustrated in FIG. 1C.

Next, process 600 proceeds to act 604, where a language model is identified from among multiple language models by using the metadata attribute value(s) obtained at act 602. A language model may be identified using any suitable number (one, two, three, four, five, etc. etc.) of metadata attribute values corresponding to the utterance obtained at act 602, as aspects of the disclosure provided herein are not limited in this respect. As one non-limiting example, a language model may be identified using a value representing information identifying the application program or operating system having the focus of the user's computing device when the voice utterance was received, a value representing information identifying a user interface element (of an application or operating system in focus) for which the voice utterance was provided, and a value representing information identifying the speaker. As another non-limiting example, a language model may be identified using a value representing information identifying the application program or operating system having the focus of the user's computing device when the voice utterance was received, a value representing information identifying a user interface element (of an application or operating system in focus) for which the voice utterance was provided, and a value representing information identifying the computing device to which a speaker provided the voice utterance by speaking.

In some embodiments, a language model may be identified from among multiple language models having been generated for respective clusters of training data instances (e.g., as described above with reference to FIG. 3). The language model may be identified by using the metadata attribute value(s) associated with the voice utterance obtained at act 602 to identify a cluster to which the voice utterance corresponds. In turn, the language model generated for that cluster may be identified as the language model to use for recognizing the voice utterance.

In embodiments in which language models are generated from clusters of training data instances, training data instances are assigned to a cluster based on the metadata attribute values associated with the training data instances for a particular set of metadata attributes. Various techniques for performing such clustering were described with reference to act 308 of process 300. Any of these techniques or any other suitable techniques may be used to identify a cluster to which the voice utterance corresponds based on the metadata attribute values associated with the voice utterance. As a non-limiting example, the clusters may be examined to identify the cluster associated with the largest set of metadata attribute values that matches the respective metadata attribute values for the voice utterance as the cluster to which the voice utterance corresponds.

In embodiments in which a decision tree clustering technique is used to cluster the training data, the decision tree may be used to identify a cluster to which the voice utterance corresponds. The process may be iterative. In the first iteration, the voice utterance may be assigned to one of the child nodes of the root node based on the value associated with the voice utterance for the metadata attribute represented by the root node. For example, if the root node represents the attribute "Time" and the root node has a child node corresponding to the time range 12-11:59 am and another child node corresponding to the time range 12-11:59 pm, the voice utterance may be assigned to the child node in accordance with the value of the "Time" attribute associated with the voice utterance. In the second iteration, the voice utterance may initially be assigned to one of the children of the child node to which the voice utterance was assigned in the first iteration. For example, if the child node to which the voice utterance was assigned represents the attribute "Application Program" and this child node has child nodes corresponding to various application programs, the voice utterance may be assigned to the child node in accordance with the value of the "Application Program" attribute associated with the voice utterance (that value indicates which application program the voice utterance was provided to). This process is repeated until the voice utterance is assigned to a leaf node in the decision tree and the voice utterance may be identified as corresponding to the cluster associated with that leaf node. In turn, the language model generated for that cluster may be identified at act 604 as the language model to use for recognizing the voice utterance. It should be appreciated that above example is merely illustrative, as decision tree need not be traversed in a hierarchical manner to identify the cluster to which a voice utterance corresponds. For example, the leaf nodes may be directly examined to identify the leaf node associated with the greatest number of metadata attribute values that match the respective metadata attribute values for the voice utterance.

In the example of FIG. 4, for instance, values associated with a voice utterance for the metadata attributes $A_1, A_2, A_3$, and $A_4$ may be used to assign the voice utterance to a cluster associated with one of the leaf nodes of decision tree 400 (i.e., nodes 408a, 412, 416, 418, 408c, 408d, and 408e). Then the language model generated for that cluster may be identified at act 604 as the language model to use for recognizing the voice utterance.

After a language model has been identified at act 604, process 600 proceeds to act 606, where voice utterance is recognized at least in part by using the identified language model. This may be done using any suitable automated speech recognition techniques that use language models, as aspects of the disclosure provided herein are not limited in this respect. After the voice utterance is recognized at act 606, process 600 completes.

Figure 7:
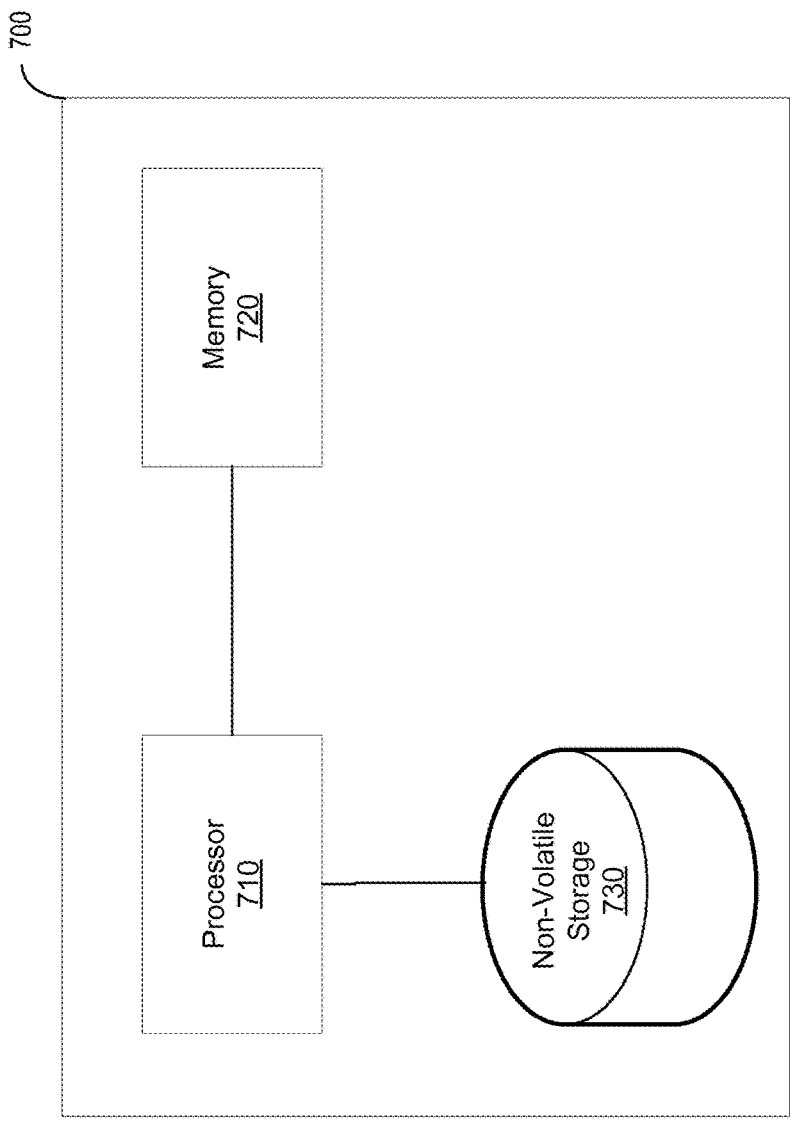
FIG. 7 is a block diagram of an illustrative computer system that may be used in implementing some embodiments.

An illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor 710 may control writing data to and reading data from the memory 720 and the non-volatile storage device 730 in any suitable manner, as the aspects of the disclosure provided herein are not limited in this respect. To perform any of the functionality described herein, the processor 710 may execute one or more processor-executable instructions stored in one or more non-transitory computer-readable storage media (e.g., the memory 720), which may serve as non-transitory computer-readable storage media storing processor-executable instructions for execution by the processor 710.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (FIGS. 3, 5, and 6) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method comprising:
    training, using at least one computer hardware processor to perform an automated two-stage training procedure having a first training stage and a second training stage different from the first training stage, an automatic speech recognition (ASR) engine at least in part by generating one or more language models for use as part of the ASR engine, the training comprising:
        obtaining language data comprising training data and associated values for one or more metadata attributes, the language data comprising a plurality of instances of language data, an instance of language data comprising an instance of training data and one or more metadata attribute values associated with the instance of training data;
        identifying, by processing the language data, a set of the one or more metadata attributes to use for clustering the instances of training data, the set of metadata attributes comprising first and second sets of metadata attributes;
        performing the first training stage, comprising:
            clustering the training data instances based on their respective values for the first set of metadata attributes to obtain a first plurality of clusters, the clustering comprising dividing the training data instances into the first plurality of clusters based on their respective values for the first set of metadata attributes; and
            generating a respective language model for multiple clusters of the first plurality of clusters to obtain a plurality of language models, the generating comprising using training data in each of one or more of the multiple clusters to generate a respective language model in the plurality of language models;

performing the second training stage, comprising:
clustering the training data instances based on their respective values for the second set of metadata attributes to obtain a second plurality of clusters, the clustering comprising subdividing the training data instances in the first plurality of clusters based on their respective values for the second set of metadata attributes to obtain the second plurality of clusters; and
generating a first language model for a first cluster in the second plurality of clusters as a first weighted mixture of language models in the plurality of language models by estimating weights of the language models in the first weighted mixture using training data instances in the first cluster; and storing the plurality of language models and the first language model for use as part of the ASR engine.

2. The method of claim 1, wherein the one or more metadata attributes comprise a plurality of metadata attributes, wherein the act of identifying the set of metadata attributes to use for clustering the instances of training data comprises:
automatically evaluating multiple of the plurality of metadata attributes, the automatically evaluating a first of the multiple metadata attributes comprising generating at least one language model for at least one group of training data instances obtained by dividing the training data instances based on their respective values for the first metadata attribute; and
identifying the set of metadata attributes based on results of the evaluation.

3. The method of claim 2, wherein automatically evaluating the first metadata attribute comprises:
dividing the training data instances, based on their respective values for the first metadata attribute, to obtain two or more groups of training data instances;
generating a child language model for each of the obtained groups of training data instances;
generating a parent language model using all the training data instances; and
calculating a score for the first metadata attribute based at least in part on how a measure of the goodness of fit of the generated child language models compares with a measure of the goodness of fit of the generated parent language model.

4. The method of claim 3, wherein generating the child language model for each of the obtained groups comprises generating a unigram language model for each of the obtained groups.

5. The method of claim 3, wherein the measure of the goodness of fit of the generated parent language model is a likelihood, according to the generated parent language model, of the training data instances used to generate the parent language model.

6. The method of claim 1, further comprising:
generating a second language model for a second cluster in the second plurality of clusters as a second weighted mixture of language models in the plurality of language models by estimating weights of the language models in the second weighted mixture using training data instances in the second cluster.

7. The method of claim 1, wherein estimating the weights is performed using an expectation maximization algorithm.

8. A system comprising:
at least one processor configured to perform acts of:
training, using an automated two-stage training procedure having a first training stage and a second training stage different from the first training stage, an automatic speech recognition (ASR) engine at least in part by generating one or more language models for use as part of the ASR engine, the training comprising:
obtaining language data comprising training data and associated values for one or more metadata attributes, the language data comprising a plurality of instances of language data, an instance of language data comprising an instance of training data and one or more metadata attribute values associated with the instance of training data;
identifying, by processing the language data, a set of the one or more metadata attributes to use for clustering the instances of training data, the set of metadata attributes comprising first and second sets of metadata attributes;
performing the first training stage, comprising:
clustering the training data instances based on their respective values for the first set of metadata attributes to obtain a first plurality of clusters, the clustering comprising dividing the training data instances into the first plurality of clusters based on their respective values for the first set of metadata attributes; and
generating a respective language model for multiple of the first plurality of clusters to obtain a plurality of language models, the generating comprising using training data in each of one or more of the multiple clusters to generate a respective language model in the plurality of language models;
performing the second training stage, comprising:
clustering the training data instances based on their respective values for the second set of metadata attributes to obtain a second plurality of clusters, the clustering comprising subdividing the training data instances in the first plurality of clusters based on their respective values for the second set of metadata attributes to obtain the second plurality of clusters; and
generating a first language model for a first cluster in the second plurality of clusters as a first weighted mixture of language models in the plurality of language models by estimating weights of the language models in the first weighted mixture using training data instances in the first cluster; and
storing the plurality of language models and the first language model for use as part of the ASR engine.

9. the system of claim 8, wherein the one or more metadata attributes comprise a plurality of metadata attributes, wherein the act of identifying the set of metadata attributes to use for clustering the instances of training data comprises:
automatically evaluating multiple of the plurality of metadata attributes, the automatically evaluating a first of the multiple metadata attributes comprising generating at least one language model for at least one group of training data instances obtained by dividing the training data instances based on their respective values for the first metadata attribute; and identifying the set of metadata attributes based on results of the evaluation.

10. the system of claim 9, wherein automatically evaluating the first metadata attribute comprises:
dividing the training data instances, based on their respective values for the first metadata attribute, to obtain two or more groups of training data instances;
generating a child language model for each of the obtained groups of training data instances;
generating a parent language model using all the training data instances; and
calculating a score for the first metadata attribute based at least in part on how a measure of the goodness of fit of the generated child language models compares with a measure of the goodness of fit of the generated parent language model.

11. The system of claim 10, wherein generating the child language model for each of the obtained groups comprises generating a unigram language model for each of the obtained groups.

12. The system of claim 10, wherein the measure of the goodness of fit of the generated parent language model is a likelihood, according to the generated parent language model, of the training data instances used to generate the parent language model.

13. The system of claim 8, wherein the at least one processor is further configured to generate a second language model for a second cluster in the second plurality of clusters as a second weighted mixture of language models in the plurality of language models by estimating weights of the language models in the second weighted mixture using training data instances in the second cluster.

14. The system of claim 8, wherein estimating the weights is performed using an expectation maximization algorithm.

15. At least one non-transitory computer-readable storage medium storing processor-executable instructions that, when executed by at least one processor, cause the at least one processor to perform a method comprising acts of:
training, using an automated two-stage training procedure having a first training stage and a second training stage different from the first training stage, an automatic speech recognition (ASR) engine at least in part by generating one or more language models for use as part of the ASR engine, the training comprising:
obtaining language data comprising training data and associated values for one or more metadata attributes, the language data comprising a plurality of instances of language data, an instance of language data comprising an instance of training data and one or more metadata attribute values associated with the instance of training data;
identifying, by processing the language data, a set of the one or more metadata attributes to use for clustering the instances of training data, the set of metadata attributes comprising first and second sets of metadata attributes;
performing the first stage, comprising:
clustering the training data instances based on their respective values for the first set of metadata attributes to obtain a first plurality of clusters, the clustering comprising dividing the training data instances into the first plurality of clusters based on their respective values for the first set of metadata attributes; and
generating a respective language model for multiple of the first plurality of clusters to obtain a plurality of language models, the generating comprising using the training data in each of the one or more of the multiple clusters to generate a respective language model in the plurality of language models;
performing the second stage, comprising:
clustering the training data instances based on their respective values for the second set of metadata attributes to obtain a second plurality of clusters, the clustering comprising subdividing the training data instances in the first plurality of clusters based on their respective values for the second set of metadata attributes to obtain the second plurality of clusters; and
generating a first language model for a first cluster in the second plurality of clusters as a first weighted mixture of language models in the plurality of language models by estimating weights of the language models in the first weighted mixture using training data instances in the first cluster; and
storing the plurality of language models and the first language model for use as part of the ASR engine.

16. The at least one non-transitory computer-readable storage medium of claim 15, wherein the one or more metadata attributes comprise a plurality of metadata attributes, wherein the act of identifying the set of metadata attributes to use for clustering the instances of training data comprises:
automatically evaluating multiple of the plurality of metadata attributes, the automatically evaluating a first of the multiple metadata attributes comprising generating at least one language model for at least one group of training data instances obtained by dividing the training data instances based on their respective values for the first metadata attribute; and
identifying the set of metadata attributes based on results of the evaluation.

17. The at least one non-transitory computer-readable storage medium of claim 16, wherein automatically evaluating the first metadata attribute comprises:
dividing the training data instances, based on their respective values for the first metadata attribute, to obtain two or more groups of training data instances;
generating a child language model for each of the obtained groups of training data instances;
generating a parent language model using all the training data instances; and
calculating a score for the first metadata attribute based at least in part on how a measure of the goodness of fit of the generated child language models compares with a measure of the goodness of fit of the generated parent language model.

18. The at least one non-transitory computer-readable storage medium of claim 17, wherein generating the child language model for each of the obtained groups comprises generating a unigram language model for each of the obtained groups.

19. The at least one non-transitory storage medium of claim 15 further storing processor-executable instructions that, when executed by at least one processor, cause the at least one processor to generate a second language model for a second cluster in the second plurality of clusters as a second weighted mixture of language models in the plurality of language models by estimating weights of the language models in the second weighted mixture using training data instances in the second cluster.

20. The at least one non-transitory storage medium of claim 15, wherein estimating the weights is performed using an expectation maximization algorithm.

* * * * *